United States Patent [19]
Gilmont

[11] 3,907,683
[45] Sept. 23, 1975

[54] MULTITUBULAR CONSTANT HEAD REFLUX CONDENSER

[75] Inventor: Roger Gilmont, Douglaston, N.Y.

[73] Assignee: Gilmont Instruments, Inc., Great Neck, N.Y.

[22] Filed: Oct. 29, 1973

[21] Appl. No.: 410,951

[52] U.S. Cl............. 202/177; 202/180; 202/185 R; 203/DIG. 2; 203/10; 202/197
[51] Int. Cl.² .......................................... E01D 3/14
[58] Field of Search .......... 202/176, 177, 180, 179, 202/161, 83, 182, 185, 235; 23/259; 203/10, DIG. 2

[56] References Cited
UNITED STATES PATENTS

| | | | |
|---|---|---|---|
| 2,251,185 | 7/1941 | Carter et al. | 202/161 |
| 2,427,142 | 9/1947 | Hornbacher et al. | 202/161 |
| 2,537,942 | 1/1951 | Martin | 202/161 |
| 2,573,807 | 11/1951 | Piros et al. | 202/161 |
| 3,395,083 | 7/1968 | Gilmont | 202/83 |
| 3,607,662 | 9/1971 | Glover | 202/161 |

Primary Examiner—Norman Yudkoff
Assistant Examiner—Frank Sever

[57] ABSTRACT

In a multitubular constant head reflux condenser for use with distillation apparatus, feed liquid is passed in heat-transfer relationship with vaporized feed liquid from the distillation apparatus to condense the vaporized feed liquid as distillate and to preheat the feed liquid almost to its boiling point prior to its entry into the distillation apparatus. A vent is provided through which the impurities volatilized by such preheating of the feed liquid can escape, and the temperature and flow rate of the feed liquid being discharged from the condenser to the distillation apparatus is controlled by a valve in the condenser through which the feed liquid is passed at a constant fluid pressure head. After a single distillation in glass distillation apparatus the quality of the distilled water is as high as 90–95 percent of conductivity water.

10 Claims, 3 Drawing Figures

MULTITUBULAR CONSTANT HEAD REFLUX CONDENSER

BACKGROUND OF THE INVENTION

U.S. Pat. No. 3,395,083, issued July 30, 1968 to the present inventor for "Laboratory Distilling Apparatus", discloses a small, portable system which is simple, inexpensive and dependable, which operates efficiently and at low cost, which is self-cleaning and therefore may be operated continuously for virtually unlimited periods of time, and which produces a distillate output of high purity. Indeed, the purification effect is no marked that the system would be advantageous even if that were its only advantage. The fact that it exhibits its other advantages of simplicity, high efficiency, low cost, and capability of continuous operation for very long periods of time make it a significant advance in the field of distillation..

In accordance with the system disclosed in the patent, the liquid to be distilled (hereinafter designated "tap water" for purposes of ready explanation, but with the understanding that the device can be used to distill other liquids as well) may be used as the coolant in the unit which condenses the distilled vapors in order to produce the liquid distillate. This of course, raises the temperature of the tap water, and tends to volatilize certain low-boiling-point impurities present in the tap water. In order to permit this effect to be usefully realized, a vent is provided in the condenser to permit the thus volatilized impurities to escape from the system.

The tap water passes through an evaporator where it is converted into steam. In connection with this part of the operaton of the system, the construction and heat-production of the evaporator and the rate of flow of tap water thereto are so correlated that the tap water is virtually instantaneously vaporized; no residue tap water remains in the evaporator so that the natural internal fractioning of the evaporator produces an inherent scouring or cleaning effect. The steam produced in the evaporator escapes therefrom and carries with it undistilled impurities and such droplets of residue tap water as may not have been converted into vapor.

The output from the evaporator goes to a cyclone separator, where the purified vapor content of the evaporator output is separated from the solids and liquid content thereof. The vapor content of the evaporator output is fed to the condenser; and the remainder of the evaporator output is fed to a trap which vents to exhaust.

The tap water, already heated by the steam in the condenser, is preferably causes to pass through the separator trap in heat-transfer relation to the contents of that trap. As a result, the trap contents, which are at a high temperature close to the boiling point of water, additionally preheat the tap water, thus bringing the tap water nearly to the boiling point before it reaches the evaporator. This greatly assists in producing the desired automatic cleaning and scouring effect of the evaporator operation. In addition, a vent is provided in the tap water feed system adjacent the point where the tap water leaves the trap, thereby to permit the escape of such impurities as may be volatilized from the tap water by reason of the heating action produced in the separator trap.

As a final step in the production of a highly purified distillate, a vent is provided in the condenser which communicates with a distillate exit path at a point where the distillate has been condensed to liquid phase, thereby to permit the escape of such impurities as may still be present involatilized form at that point before such impurities can recondense and contaminate the distillate.

The entire system is designed to operate on the basis of a continuous flow of liquid for condenser cooling and for distillate supply, with a continuous cleaning of the system during operation and the automatic removal of impurities from that system. As a result, there is no impurity build-up in any part of the system. Hence the operation can continue for exceptionally long, and theoretically unlimited, periods of time.

As pointed out above, it is essential in the patented system that the tap water be preheated almost to its boiling point prior to introduction into the evaporator so as to enable the evaporator to virtually instantaneously vaporize the entering tap water and also so as to maximize the rate at which volatile impurities are removed from the tap water by venting prior to introduction of the preheated tap water into the evaporator. The flow rate of the preheated tap water into the evaporator must also be regulated and constant to insure that the heat transfer capacity of the evaporator is neither exceeded nor under-utilized both of which result in economic inefficiencies. Too high a flow rate causes delayed vaporization and an unnecessary loss of sensible heat in the evaporator; too low a rate results in poorer self-cleaning action of the evaporator and possible burn-out of the evaporator heating element. In the patented system, the flow rate of the tap water entering the evaporator is not closely regulated (and in fact regulated only as part of the regulation of the total amount of cooling liquid entering the system) and the temperature of the preheated tap water leaving the condenser for passage to the separator trap and evaporator is typically considerably below the boiling point (and in fact regulated only as part of the regulation of the temperature of all the cooling liquid leaving the condensor). Hence, while the purity of the distillate of the patented system is considerably above that obtained in prior art processes of comparable cost and complexity, the purity is still below that theoretically obtainable by the process. More specifically, the quality of the distillate of the patented system is only about 10% that of conductivity water; i.e., pure water in which the electrical conductivity is due only to hydrogen and hydroxyl ions released from the equilibrium dissociation of water.

In order to obtain a distillate of higher quality without recourse to several distillation passes or the use of expensive quartz distillation apparatus, it is necessary to devise a system which permits precise regulation of the flow rate and temperature of the tap water fraction passed from the condenser to the distillation apparatus as feed water independently of the regulation of the flow rate of the total cooling water (including the feed water) and the temperature of the cooling water leaving the condenser as waste. A major problem encountered in using a valve to control the flow rate of the tap water passing from the condenser to the distillation apparatus as feed water is that fluctuations in the pressure head immediately upstream of the valve (as might result from fluctuations in the flow rate of the total cooling water) affect operation of the valve and hence the flow rate downstream thereof.

Accordingly, it is a primary object of the present invention to provide a constant head reflux condenser for use in conjunction with distillation apparatus to provide a distillate of high quality by permitting close regulation of the temperature and flow rate of the preheated tap water being discharged from the condenser to the evaporator.

It is another object to provide such a condenser which permits regulation of the flow rate of the preheated tap water being discharged to the evaporator independently of the flow rate of the total cooling water being discharged from the condenser.

It is also an object to provide such a condenser in which the temperature of the preheated tap water being discharged to the evaporator is regulated independently of the temperature of the total cooling water being discharged from the condenser.

It is a further object to provide such a condenser in which regulation of the flow rate of the preheated tap water being discharged to the evaporator is facilitated by maintenance of a constant liquid pressure head upstream of a condenser valve controlling the flow rate.

Another object is to provide such a condenser in which the preheated tap water being discharged from the condenser is almost at its boiling point.

Still another object is to provide a process utilizing such a condenser.

Yet another object is to provide distillation apparatus utilizing such a condenser.

SUMMARY OF THE INVENTION

It has now been found that the above and related objects may be obtained in distillation apparatus including an evaporator for vaporizing feed liquid and a condenser for condensing distillation vapor from the evaporator and preheating the feed liquid for the evaporator. In the condenser there is a vapor conduit for passage of distillation vapor therethrough and a liquid conduit in heat-transfer relationship with the vapor conduit for passage of feed liquid therethrough to partially preheat the feed liquid and condense the distillation vapor. Additionally, there is a valved liquid conduit having an upper inlet end communicating with the liquid conduit intermediate the ends thereof to receive a fraction of the partially preheated feed liquid, and a lower outlet end communicating with the evaporator to forward the fraction of feed liquid thereto. Adjustable valve means are disposed intermediate the ends of the valved liquid conduit to regulate the flow of the fraction of feed liquid therethrough, and hence to the evaporator. Preferably, a substantial length of the valved liquid conduit between the valve means and outlet end is in heat-transfer relationship with the vapor conduit, so that the fraction of feed liquid passing therethrough is further preheated during passage through such substantial length of the valve liquid conduit, the further preheating permitting the fraction of feed liquid to approach its boiling point.

The valve means is preferably disposed in a plane below the plane of the outlet end of the valved liquid conduit, so that a constant head of liquid pressure formed in the length of the valved liquid conduit between the horizontal planes of the ends thereof is presented to the valve means. The application of the constant head of liquid pressure above the valve means enables precise regulation of the flow rate of the feed liquid through the valve and into the boiler, despite fluctuations in the flow rate of the total feed liquid being introduced into the system for use as cooling water.

More specifically, the condenser is contained in a vertically-extending multitubular housing. Feed liquid distillation vapor from the distillation apparatus is introduced adjacent the base of the housing, passed upwardly in the housing, and the uncondensed portion thereof discharged adjacent the top of the housing as waste vapor, while the condensed portion is discharged adjacent the base of the housing as distillate. Meanwhile, feed liquid is introduced adjacent the base of the housing, passed upwardly in heat-transfer relationship with the vapor (to condense the vapor and to partially preheat the feed liquid), and a fraction of the feed liquid is discharged adjacent the top of the housing as spent cooling liquid, while the remainder of the feed liquid is recirculated downwardly to adjacent the base of the housing. The recirculated remainder of the feed liquid is then passed upwardly in heat-transfer relationship with the vapor (to further preheat the feed liquid) and discharge at a point intermediate the ends of the housing for passage to the distillation apparatus.

Preferably a valve is provided in the path of the recirculating remainder of the feed liquid and adjusted so as to fix the quantity of feed liquid being recirculated and, hence, the temperature of the recirculated feed liquid being discharged to the distillation apparatus. Generally speaking, the smaller the quantity of the feed liquid being recirculated, the higher will be temperature of the recirculated feed liquid being discharged to the evaporator.

DETAILED DESCRIPTION OF THE PREFERRED EMBODIMENTS

Figure 1:
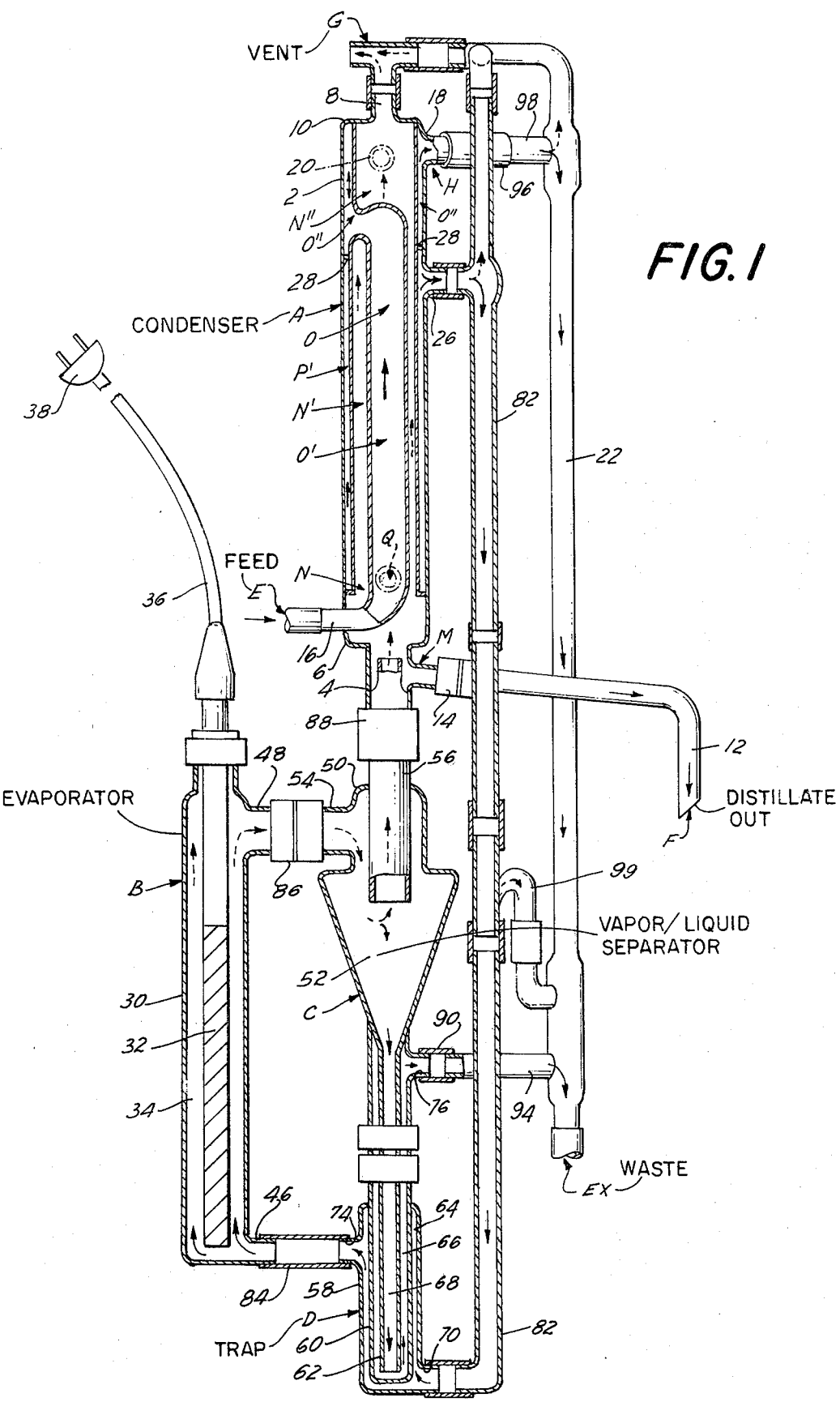
FIG. 1 is a front elevation view in cross-section of one embodiment of the present invention.

Referring now to the drawing, wherein solid arrows indicate the direction of flow for liquids (or liquids and entrained gases) and dotted arrows indicate the direction of flow for gases or vapors, therein illustrated in a distilling system comprising a reflux condenser generally designated A, an evaporator generally designated B, and a separator generally designated C provided with a trap generally designated D. Generally speaking, the liquid to be distilled enters the system at point E and flows through the condenser A where it is preheated, then through the separator trap D where it is further preheated, and finally to the evaporator B where it is volatilized. The output from the evaporator B enters the separator C, where its gaseous portion is separated from its solid and liquid portion. The gaseous portion is conveyed to the condenser A, where it is condensed into liquid and from which the distillate emerges at point F. The solids and liquids content of the evaporator output passes through the separator trap D (a small but steady flow of waste water therethrough is envisaged) and is then vented to waste at point EX. The condenser A is provided with a vent generally designated G in gaseous communication with both the distillation vapor and the tap water so that gaseous impurities in the distillation vapor and impurities volatilized from the tap water (as a result of its being preheated during passage through the condenser A) can escape from the system.

More cooling liquid is needed in the condenser A than can subsequently be distilled on a continuous basis. Accordingly, a large volume of cooling water enters the system at point E and flows through the condenser A where it is partially preheated. A portion of the liquid is discharged from the condenser A at outlet H for eventual disposal at point EX, and (FIG. 2) the remainder of the liquid is recirculated by means of a valved liquid conduit P prior to passage to separator trap D and evaporator B. Within the valved liquid conduit P this recirculating fraction of the cooling water is metered through micro-flow valve means I at a constant head of liquid pressure and further preheated to insure that is is close to its boiling point before discharge from the condenser A. Before turning to a more specific description of the elements of the distilling system, it is important to note that only that portion of the cooling or feed liquid introduced at point E which is ultimately to undergo distillation passes through the valved liquid conduit P. Accordingly, the valve means I controls the flow rate only of the liquid to be distilled and it is only that liquid which undergoes further preheating within the valved liquid conduit P.

Figure 2:
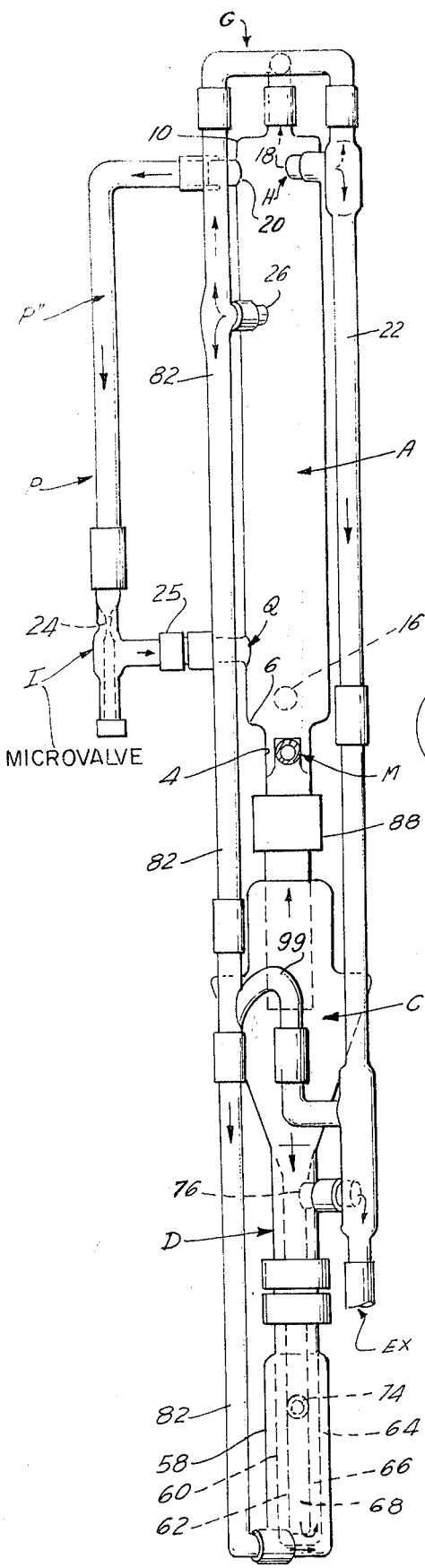
FIG. 2 is a side elevation view of the embodiment of FIG. 1.
Figure 3:
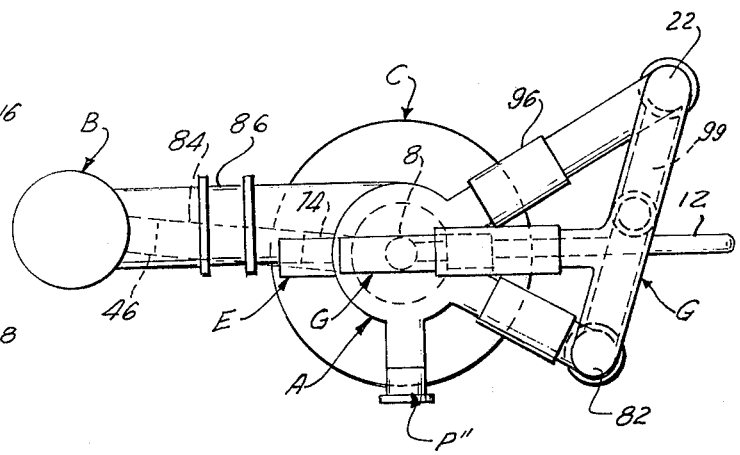
FIG. 3 is a top plan view of the embodiment of FIG. 1.

I describe now the individual elements (i.e., condenser A, evaporator B, separator C, and trap D) of the distilling system in turn. The condenser A comprises a vertically-extending milti-tubular housing 2 having a condensed distillate output conduit M, a generally vertically-extending vapor conduit N, a generally vertically-extending liquid conduit O, and a generally vertically-extending valved liquid conduit P (FIG. 2). The housing 2 and each of the conduits are conveniently formed of a low-expansion, heat-resistant glass.

The vapor conduit N provides gaseous communication between a vapor inlet 4 disposed adjacent the base 6 of the housing 2 for introducing distillation vapor into the housing 2, and a vapor outlet 8 disposed adjacent the top 10 of the housing 2 for removing uncondensed distillation vapor from the housing 2. The condensed distillate output conduit M is disposed adjacent the housing base 6 and communicates with the vapor conduit N for removal of condensed distillation vapor from the housing 2. Naturally, suitable tubing 12 may be connected to the condensed distillate output conduit M by means of a coupling 14 in order to permit transportation of the liquid distillate to a desired output location F, and preferably into a closed vessel (not shown) to maintain optimum distillate purity.

The liquid conduit O, which is a heat-transfer relationship with a substantial length of the vapor conduit N, provides liquid communication between a feed liquid inlet 16 (fed from point E) disposed adjacent the housing base 6 for introducing the tap water or feed liquid into the housing 2, an excess liquid outlet 18 disposed adjacent the housing top 10 for removal of a fraction of the tap water from the housing 2, and a recirculating liquid outlet 20 disposed slightly below the excess liquid outlet 18 for removal of the remaining tap water. If desired, the total amount of tap water entering the feed inlet 16, including that fraction of the total which is later transferred to the distillation apparatus (including the separator trap D and evaporator B), may be regulated by conventional means such as a valve (not shown); however, the temperature and amount of the tap water being forwarded from the condenser A to the distillation apparatus B for vaporization is regulated independently of such a valve, as described hereinafter in detail. Of the total quantity of tap water entering through the feed liquid inlet 16, a fraction is discharged from the liquid conduit O through the recirculating liquid outlet 20 for eventual passage into the distillation apparatus, with the bulk of the tap water being discharged as spent cooling water through the excess liquid outlet 18 into a vented drain pipe 22. The ratio of liquid being discharged through the excess liquid outlet 18 relative to that discharged through the recirculating liquid outlet 20 is controlled by valve 24 hereinafter described in detail. The quantity of tap water entering the system through the feed liquid inlet 16 must be sufficient to provide substantially total condensation of the distillation vapors for economical operation, while the total amount of tap water being discharged through the recirculating liquid outlet 20 must be small enough to ensure that it is close to the boiling point, yet large enough to make use of the full capacity of the evaporator B. The difference in height between the two liquid outlets 18, 20 is not critical, and may be on the order of a few millimeters.

The valved liquid conduit P (FIG. 2) has an adjustable micro-flow valve 24 for regulating the flow of feed liquid therethrough and provides liquid communication between the recirculating liquid outlet 20 (used as an inlet for the tap water fraction passing through the valved liquid conduit P) and an overflow liquid outlet 26, disposed intermediate the feed liquid inlet 16 and the excess liquid outlet 18, for transferring of such tap water fraction from the housing 2 to the distillation apparatus. It will be noted that the valved liquid conduit P extends from the recirculating liquid outlet 20 downwardly and spaced from the central portion of the housing 2, through micro-flow valve 24 and coupling 25 back into the central portion of the housing 2 at point Q, and hence upwardly to the overflow liquid outlet 26. Accordingly, only the internal portion of the valved liquid conduit P between the re-entry point Q near the housing base 6 and the overflow liquid outlet 26 is in heat-transfer relationship with the vapor conduit N; however, a substantial length of the conduit P between valve means 24 and the overflow liquid outlet 26 is included in that internal portion.

As the flow pressure head of the liquid entering the valve 24 is a function of the difference in height between the recirculating liquid outlet 20 and the overflow liquid outlet 26, the precise location of the overflow liquid outlet 26 between the feed liquid inlet 16 and the excess liquid outlet 18 is therefore selected to present the desired fluid pressure head at and just upstream of the micro-flow valve 24 which is disposed below the level of the overflow liquid outlet 26. A fluid pressure head of about 80 millimeters is recommended. Obviously, the setting of the micro-flow valve 24 determines the fraction of the tap water passing through the overflow liquid outlet 26 for passage to the separator trap D and evaporator B, and indirectly the proportion of the tap water being discharged through the excess overflow outlet 18. Generally speaking, the flow through the valve 24 is regulated to insure that the temperature of the tap water exiting through the overflow liquid outlet 26 is almost at its boiling point, the temperature of the exiting tap water being an inverse function of the openess of the valve 24. Thus, as earlier mentioned, the temperature and quantity of the tap water ultimately passing to evaporator B is regulated independently of temperature and quantity of the tap water being discharged as spent cooling water.

The housing 2 is further provided with a common vent G which communicates with the vapor outlet 8, the excess liquid outlet 18, and the overflow liquid outlet 26. Because of the high temperature of the tap water being discharged from the overflow liquid outlet 26, a large portion of the volatile impurities therein escape through the vent G.

Turning now to the details of the preferred condenser design illustrated in the drawing, a substantial length of the liquid conduit O is disposed below the horizontal plane of the overflow liquid outlet 26 and comprises an interior or central liquid channel O', while a substantial length of the liquid conduit O is disposed above the horizontal plane of the overflow liquid outlet 26 and comprises an exterior or peripheral liquid channel O'', the central and peripheral liquid channels O', O'' being in direct communication. The low end of the central liquid channel O' is in liquid communication with the feed liquid outlet 16, and the high end of the peripheral liquid channel O'' is in liquid communication with the excess liquid outlet 18 and the overflow liquid outlet 26. The length of the valved liquid conduit P within the central portion of the housing 2 comprises a second exterior or peripheral liquid channel P' disposed beneath the aforementioned peripheral liquid channel O'' of the liquid conduit O and spaced outwardly from the central liquid channel O' of the feed liquid conduit O. The second peripheral liquid channel P' is fed at point Q by the external portion P'' of valved liquid conduit P and is sealed at its upper end 28 to preclude an escape of tap water therefrom except through the overflow liquid outlet 26. The vapor conduit N below the overflow liquid outlet 26 is comprised of the annulus N' formed between the peripheral liquid channel P' of the valved liquid conduit P and the central liquid channel O' of the liquid conduit O, and communicates directly with an interior or central gas channel N'' disposed above the plane of the overflow liquid outlet 26 and interior to the peripheral liquid channel O'' of the feed liquid conduit O.

The evaporator B comprises an elongated glass tube 30 within which an elongated electrically energized heater element 32 is disposed, a narrow elongated space 34 being defined between the heating element 32 and the wall 30. The heating element 32 is electrically connected to leads 36 which extend to a plug 38 adapted to be received in any suitable electric outlet. If desired, a pilot light may be inserted in the electrical circuit to indicate when the heating element 32 is energized, and a thermostatic safety device may be secured to the outer surface of the wall 30 and connected by leads into the electrical circuit for the heater element 32, in order to terminate heater operation if overheating occurs. The wall 30 of the evaporator B is provided at its lower end with an input tube 46 and at its upper end with an outlet tube 48.

The separator C, designed to operate on the cyclone principle, comprises an enclosure wall 50 defining a cyclone separator space 52. An input tube 54 communicates in an off-center tangential manner with the upper portion of the space 52. A gas outlet tube 56 extends through the top portion of the wall 50 and projects into the separator space 52 to a position below the input point of the tube 54.

The separator trap D is connected to the bottom of the separator C, and comprises an outer wall 58 and radially spaced coaxial inner walls 60 and 62. The wall 60 is closed at the bottom end and is connected to the wall 58 at its upper end. The wall 62 is open at its lower end and communicates with the separator space 52. Spaces 64 and 66 are defined, respectively, between the wall 58 and the tube 60 and between the tubes 60 and 62, and a space 68 is defined inside the tube 62. The bottom of trap D is provided with an inlet tube 70 which communicates with the space 64 at its lower end and with an outlet tube 74 which communicates with the space 64 at its upper end. The trap D is also provided with an exhaust tube 76 which communicates with the space 66 at its upper end. The tap water exiting the separator trap D through outlet tube 74 is not vented, so any volatile impurities volatilized in trap D are transported to the evaporator B with the tap water.

The connections between the units A, B, C and D are as follows: Overflow tube 82 connects the condenser overflow liquid outlet 26 to the trap inlet tube 70. Coupling 84 connects the trap outlet tube 74 to the evaporator inlet tube 46. Coupling 86 connects the evaporator outlet tube 48 to the cyclone inlet tube 54. Coupling 88 connects the cyclone gaseous output tube 56 to the vapor inlet tube 4 at the bottom of the condenser A. Coupling 90 and tube 94 connects the trap exhaust tube 76 to drain pipe 22 and hence to exhaust point EX. Coupling 96 and tube 98 connect the condenser excess liquid outlet 18 to drain pipe 22 and exhaust point EX. An inverted "U" shaped emergency tube 99 connects overflow tube 82 and vented drain pipe 22 so that volatilized impurities from the preheated tap water leaving overflow liquid outlet 26 have an additional opportunity to escape beyond that afforded by vent G and to permit escape of the preheated tap water from the system in case a blockage occurs in trap D or evaporator B.

In the operation of the illustrated embodiment, the tap water functions both as a cooling liquid and as the supply of liquid to be distilled. The tap water from entry point E enters feed liquid inlet 16 of housing 2, passes up through the central liquid conduit channel O' and into the peripheral central liquid conduit channel O'' (where it is preheated by heat exchange with the vapors in vapor conduit N), and thereafter is divided into two streams. One stream (consisting of spent cooling water) exits from the housing 2 through the excess liquid outlet 18 for venting and discharge at point EX through the drain pipe 22; the other stream (consisting of partially preheated liquid destined for evaporator B) exits the liquid conduit O through the recirculating liquid outlet 20, enters the valved liquid conduit P, passes downwardly through the external piping P'' including the micro-flow valve 24 and then passes upwardly through the peripheral liquid channel P' of the valved liquid conduit P (where it is further preheated), and discharges from the housing 2 through the overflow liquid outlet 26. That portion of the tap water which discharges through overflow liquid outlet 26 passes downwardly through vented overflow tube 82 to trap inlet pipe 70 (typically bypassing emergency tube 99) and flows up through the space 64 in the trap D (where it is still further preheated) exiting therefrom through the trap outlet tube 74. It then flows through coupling 84 to the evaporator inlet tube 46, enters the evaporator B at the bottom of the space 34, and is there heated by nized in the art and easily determined during operation of the apparatus; i.e., temperature of the input tap water, heat capacity of the boiler, etc. With tap water supplied at a temperature of approximately 10°C and drain water being discharged at about 55°C, an input rate of flow of about 20 liters per hour is feasible, producing an output of highly purified distillate water at a rate of approximately 2 liters per hour. The purity of the distillate is exceptionally high — it is pyrogen-free, contains no more than 0.5 parts per million of total solids and has a resistivity of about 1.20 megaohm-centimeters at 98.6°C (compared to a resistivity of about 1.32 for conductivity water at the same temperature). Its quality is thus at least 90 percent that of conductivity water, and as high as 95 percent, a quality heretofore attainable only through the use of double or triple distillation or quartz distillation apparatus (including an all quartz condenser), both of these being expensive and difficult to operate. This achievement is predicated primarily on the ability to present the tap water in condenser B to micro-flow value 24 at a constant fluid pressure head so as to permit precise regulation of the preheated tap water leaving condenser overflow outlet 26 in flow rate and, hence, temperature — independently of the flow rate and temperature of spent cooling water passing from condenser A to waste The systems of the present invention have been here specifically described in terms of use for the production of distilled water, and particularly distilled tap water, applications for which they are particularly well adapted. They are not limited to such uses, however, but are generally adaptable to a wide variety of distillation procedures and to operation on liquids of widely varying compositions. The specific embodiment here disclosed constitutes a small, light, sturdy and inexpensive assembly which can be mounted within a suitcase-size portable container, but it will be apparent that the system may be constructed in widely different sizes and with many different structural variations depending on intended use.

By way of contrast with the vented separator trap in the still system disclosed in U.S. Pat. No. 3,395,083, it will be noted that the tap water exiting trap D through outlet tube 74 is not vented in the instant system. This is because the instant system permits such close control of the flow rate and temperature of the feed water leaving the condenser A for evaporator B that the bulk of the volatile impurities are volatilized within the condenser A and the few remaining volatile impurities subsequently volatilized in trap D may be transported into the evaporator B with the tap water without degrading performance of the system. It will further be noted, by way of contrast with the overhead condenser in the patented still system, that the reflux nature of the condenser A of the instant system results in a distillate product with a temperature close to its boiling point; accordingly, the distillate should be maintained in a closed vessel until it has cooled sufficiently to minimize reabsorption of impurities. An advantage accruing from use in the instant system of a reflux condenser is the additional purification by rectification afforded by such condensers.

Now that the preferred embodiments of the present invention have been shown and described in detail, various modifications and improvements thereon will become readily apparent to those skilled in the art. For example, a low level cut-off switch may be provided in the evaporator to terminate operation of the heating element when the level of feed water therein drops below a critical level and to re-energize the heating element once the feed water level returns to the critical level (or a second level). Accordingly, the spirit and scope of the present invention is to be considered as defined not by the foregoing disclosure, but only by the appended claims.

I claim:

1. In distillation apparatus comprising an evaporator for vaporizing feed liquid and a condenser for condensing distillation vapor from said evaporator and preheating the feed liquid for said evaporator, the improvement wherein said apparatus comprises:
    A. a vapor conduit in fluid communication with said evaporator for passage of distillation vapor therethrough;
    B. a liquid conduit in advance of and in fluid communication with said evaporator and in heat-transfer relationship with said vapor conduit for passage of feed liquid therethrough to partially preheat said feed liquid and condense said distillation vapor; and
    C. a valved liquid conduit for further preheating a portion of said partially preheated feed liquid having
        i. an inlet communicating with said liquid conduit intermediate the ends thereof to receive said portion of partially preheated feed liquid,
        ii. an outlet communicating with said evaporator to forward said portion of further preheated feed liquid thereto, and
        iii. an adjustable valve means intermediate said inlet and outlet for regulating the flow of said portion of feed liquid therethrough.

2. The distillation apparatus of claim 1 wherein a length of said valved liquid conduit between said valve means and said outlet is in heat-transfer relationship with said vapor conduit, said length being sufficient to further preheat substantially to the boiling point said portion of feed liquid during passage therethrough.

3. The distillation apparatus of claim 1 wherein said inlet is disposed in a plane above the plane of said outlet and said valve means is disposed in a plane below the plane of said outlet, whereby a constant head of liquid pressure, formed in the length of said valved liquid conduit between the horizontal planes of the said inlet and outlet thereof, is presented to said valve means.

4. The distillation apparatus of claim 2 wherein said inlet, said outlet and said valve means are disposed in successively lower horizontal planes.

5. The distillation apparatus of claim 1 wherein said inlet communicates with said liquid conduit adjacent the outflow end thereof.

6. The distillation apparatus of claim 1 wherein said condenser is a constant head reflux condenser comprising a multi-tubular housing having said vapor conduit, said liquid conduit, said valved liquid conduit, and additionally a condensed distillate output conduit in communication with said vapor conduit for removal of condensed distillation vapor from said housing,
    A. said vapor conduit having in gaseous communication
        i. a vapor inlet disposed adjacent one end of said housing for introducing distillation vapor from said evaporator into said housing, and the heater element 32. The steam thus produced, and such liquid or solid components as may be present, move up through space 34 in the evaporator B and exit through outlet tube 48, from which it passes through coupling 86 and the cyclone separator inlet tube 54 into the cyclone separator space 52. As the gas with entrained liquid and solid components spins in the space 52, the liquid and solid component thereof (and such portions of the gaseous component thereof which condense during this operation) flow into the trap D, passing down through space 68 and up through space 66 and then flowing to exhaust EX via tube 76, coupling 90, tube 94 and drain pipe 22.

The gaseous content or distillation vapor of the cyclone separator space 52 passes upwardly through separator gas outlet tube 56, coupling 88 and the vapor inlet 4 of condenser A, upwardly through the annular channel space N' of the vapor conduit N, and hence into the central vapor channel N'' thereof, the uncondensed portion escaping through the vapor outlet 8 to vent G. Since the vapor conduit N extends alongside of and is in heat-transfer relationship with substantially all of the liquid conduit O and the interior portion P' of the valve liquid conduit P, the vapor is cooled by the tap water flowing therethrough and condenses for discharge at point F through distillate output tube H, coupling 14 and tube 12.

As the flowing tap water cools the vapor, it absorbs heat; and when it reaches overflow liquid outlet 26 or excess liquid outlet 18, it will therefore be at a greatly elevated temperature, and some impurities which may have been in the tap water initially may have volatilized at that point. These volatilized impurities will escape from the system through the vent G connecting the vapor outlet 8, the excess liquid outlet 18, and the overflow liquid outlet 26.

The heated tap water exiting overflow liquid outlet 26 and flowing down tube 82 enters the separator trap D and flows upwardly through the space 64, where it is in heat-transfer relationship with the trap liquid in the spaces 66 and 68, that trap liquid constituting the liquid output from the separator C and thus being at a temperature very close to the boiling point of water. A small but steady flow through the trap spaces 66 and 68 should be maintained. Thus, the tap water, as it passes through the trap D, is again heated — primarily to compensate for cooling occurring during passage through overflow tube 82 — and when it leaves the trap D it is again at a greatly elevated temperature, preferably one quite close to its boiling point. Additional volatile impurities in the tap water may be volatilized at this point, but they are carried along with the tap water.

Since the water to be distilled, when it enters the evaporator B, is at a very high temperature, preferably almost at its boiling point, boiling will commence very quickly after it enters the space 34. The heating capacity of the heating element 32, coupled with the rate of flow of water into the space 34, is such that not only is virtually all of the water converted into steam in the evaporator B, and substantially instantaneously but the flow of steam therethrough is sufficiently great so as to carry with it all of the non-volatilized components of the tap water, as well as such droplets of residue tap water as may not have been converted into vapor. The provision of a narrow elongated space 34 through which the tap water and its evaporation products flow as they pass through the evaporator B assists in the attainment of this result. Consequently, the evaporator B is self-cleaning, with all impurities being removed therefrom as fast as they are produced.

The volatile waste portion of the evaporator output, which includes gaseous impurities having a lower condensation point then the distillation vapors, passes from separator space 52 through the vapor conduit N of condenser A to exhaust vent G.

The liquid and solid waste portion of the evaporator output, which includes the undistilled impurities, such water as may not have been converted into steam in the evaporator, and such portion of the gaseous output of the evaporator as may condense during its stay within the separator space 52, passes from separator space 52 to the trap D and then to exhaust EX.

Thus the volatile impurities from evaporator B escape through condenser vent G and the nonvolatile impurities are carried out of the system through the trap D by the flow of waste water therethrough, all continuously as the still operates. Consequently, the entire system is self-cleaning, there is no buildup of impurities within the system, and the system may be continuously operated for an exceptionally long, and theoretically unlimited period of time.

In a preferred mode of operation, for each part of distillate produced, approximately ten parts of tap water are fed to the system of point E, eight parts overflowing to drain through the excess liquid outlet 18 and thus functioning only as condenser coolant. Two parts overflow through the recirculating outlet 20 and constitute the liquid to be distilled in evaporator B. Of these two parts, approximately one part ends up as distillate emerging from separator C at tube tip F, the other part flowing through the trap D and joining the eight parts of cooling fluid in passing to exhaust EX. The rate of flow of the input tap water is adjusted prior to point E for optimum results. If insufficient flow is provided for a given setting of valve 24, the temperature of the spent cooling will be very high and, in extreme cases, uncondensed steam may escape from the condenser A or even the distillate outlet F. If excessive flow is provided for a given setting of valve 24, there will be a loss of sensible heat and hence distillate product.

The valve 24 is opened fully during start-up of the system to flush any air or other gases from the valved liquid conduit P. Thereafter the valve 24 is gradually closed until a proper division of input liquid between excess liquid outlet 18 and recirculating liquid outlet 20 is attained. If the valve 24 is excessively open, the amount of distillate product produced will be unnecessarily low and some of the heat being imparted to the distillation vapor by the boiler will be wasted in heating of the feed water. If the valve 24 is excessively closed, there will be insufficient cooling water to condense the distillation vapors and some of the distillation vapors will escape through vent G of the condenser A as waste steam, thus wasting both valuable heat and potential distillate product. Another factor to be considered in setting the valve 24 is the maintenance of a flow rate of liquid, from separator C through separator trap D and into drain pipe 22, sufficient to insure the removal of solid liquid impurities from the trap D. Generally a roughly equal distribution of output from the evaporator B between the trap D and the condenser A achieves this result. Obviously the preferred flow ratios of input tap water to distillate product, spent cooling water, and trap waste will vary according to factors well recogii. a vapor outlet disposed adjacent the other end of said housing for removing uncondensed distillation vapor from said housing;

B. said liquid conduit having serially in liquid communication
  i. a feed liquid inlet for introducing feed liquid into said housing,
  ii. a recirculating liquid outlet for removal of said portions of partially preheated liquid, and
  iii. an excess liquid outlet for removal of the remainder of partially preheated feed liquid from said housing; and C. said valved liquid conduit having in liquid communication through said adjustable valve means
  i. said recirculating liquid outlet as said inlet for said portion of partially preheated feed liquid, and
  ii. an overflow liquid outlet disposed in a horizontal plane below the horizontal plane of said recirculating liquid outlet as said outlet to forward said portion of further preheated feed liquid from said housing to said evaporator;
  a length of said valved liquid conduit connecting said recirculating liquid outlet and said overflow liquid outlet being in heat-transfer relationship with said vapor conduit, said length being sufficient to further preheat substantially to its boiling point said portion of feed liquid passing therethrough; and
  said adjustable valve means being disposed below the horizontal plane of said overflow liquid outlet, whereby a constant head of liquid pressure formed in the length of said valved liquid head conduit between the horizontal planes of said recirculating liquid outlet and said overflow liquid outlet is presented to said adjustable valve means.

7. The distillation apparatus of claim 6 wherein the length of said valved liquid conduit connecting said recirculating liquid outlet and said adjustable valve means is spaced from both said vapor conduit and said liquid conduit.

8. The distillation apparatus of claim 6 wherein said housing is generally vertically-extending; said vapor inlet, said condensed distillate output conduit, and said feed liquid inlet being disposed adjacent the base of said housing; said vapor outlet and said excess liquid outlet being disposed adjacent the top of said housing.

9. The distillation apparatus of claim 8 wherein a length of said liquid conduit disposed below the horizontal plane of said overflow liquid outlet comprises an interior liquid channel and a length of said liquid conduit disposed above the horizontal plane of said overflow liquid outlet comprises an exterior liquid channel, said interior and exterior liquid channels being in direct communication, the low end of said interior liquid channel being in liquid communication with said feed liquid inlet and the high end of said exterior liquid channel being in liquid communication with said excess liquid outlet; and wherein a length of said valved liquid conduit in heat-transfer relationship with said vapor conduit comprises a second exterior liquid channel disposed below said first exterior liquid channel; and wherein said interior liquid channel and said second exterior liquid channel define therebetween an annulus forming a portion of said vapor conduit; and wherein the remainder of said vapor conduit above said vapor conduit portion comprises an interior vapor channel.

10. The distillation apparatus of claim 6 further including a vent common to said excess liquid outlet and said overflow liquid outlet.

* * * * *